UNITED STATES PATENT OFFICE.

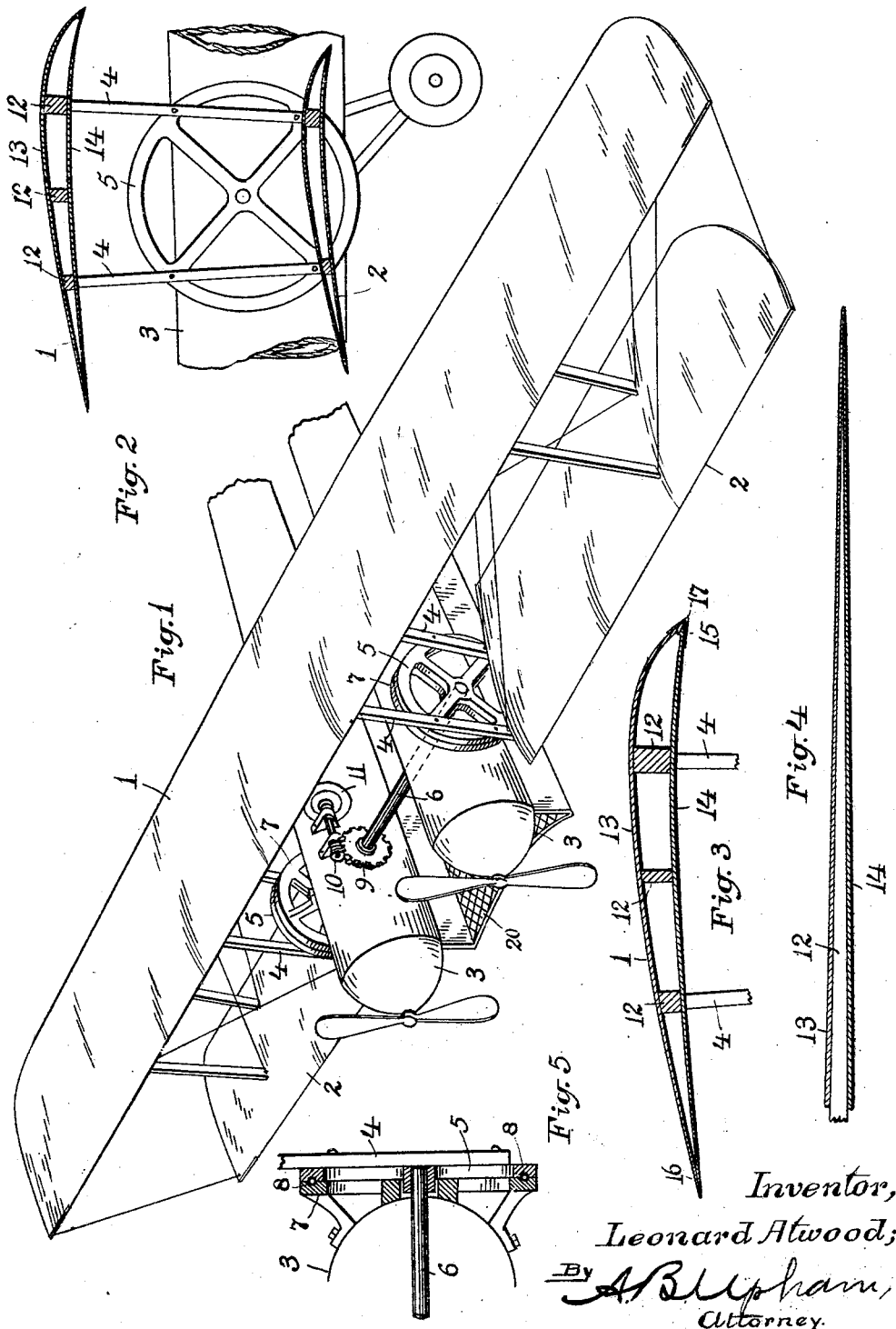

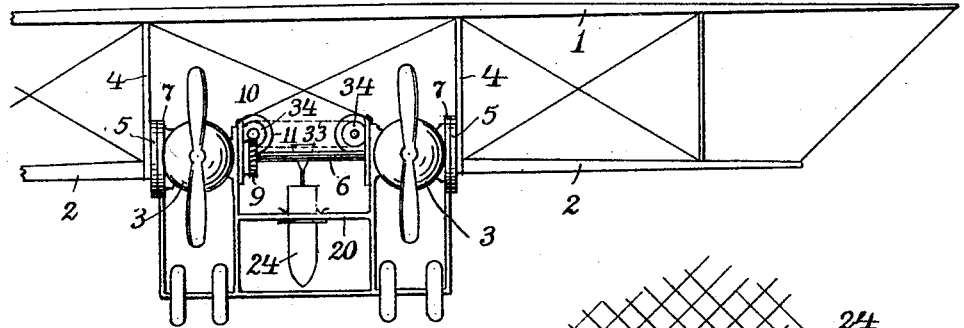
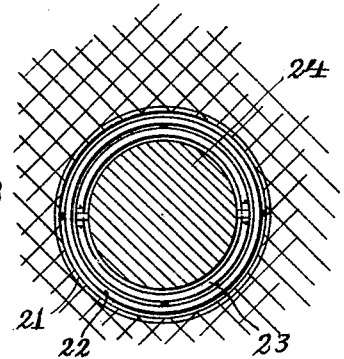
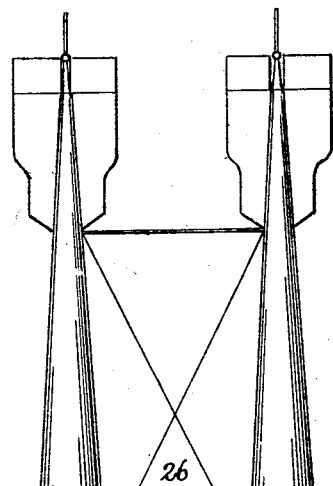
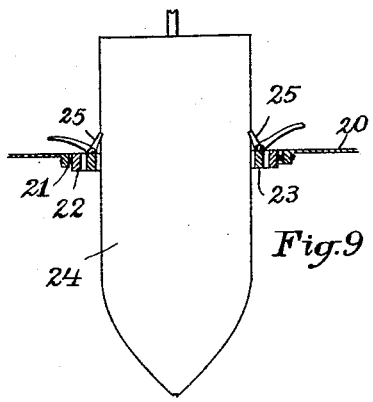
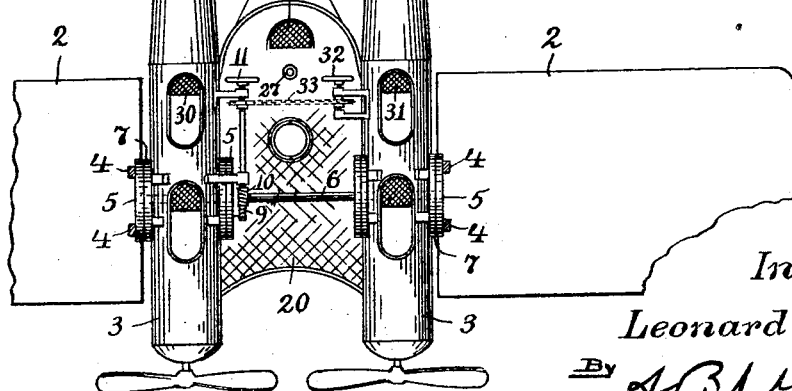

LEONARD ATWOOD, OF BOSTON, MASSACHUSETTS.

AEROPLANE.

1,325,685.  Specification of Letters Patent.  Patented Dec. 23, 1919.

Application filed April 17, 1918. Serial No. 229,100.

*To all whom it may concern:*

Be it known that I, LEONARD ATWOOD, a citizen of the United States, and a resident of Boston, in the county of Suffolk and Commonwealth of Massachusetts, have invented certain new and useful Improvements in Aeroplanes, of which the following is a full, clear, and exact specification.

In the construction of aeroplanes, it is customary to set the planes or wings at an angle with respect to the line of the fuselage in order to enable the machine to mount into the air after a preliminary speeding up along the ground. When, however, the aeroplane is flying horizontally, this upward inclination of the wings must be counteracted by the rudders, thus giving a resistance to the progress of the machine which materially reduces its speed.

If, on the other hand, the incidence of the planes is reduced to give greater speed on the horizontal, the distance the machine must run along the ground before mounting is correspondingly increased, and its time in reaching a high altitude is likewise greatly increased.

Further, when the aeroplane engine goes dead, or some other difficulty causes the same to dive, the more steeply the flying machine turns its nose downward, the less is the value of the planes as a supporting medium, and the greater the certainty of destruction, and the speed of its descent.

Another trouble met with in the manufacture and use of aeroplanes is their frailty of construction, liability to combustion, expense in labor and materials, and their danger of injury due to rain on the exterior of the planes, and to the moisture of condensation in the interior of the planes, the fuselage and other parts.

The object of this invention is the construction of an aeroplane which can be made to mount as quickly and steeply as the power of its engine will permit, which will fly on a straightaway course with a minimum of resistance and consequently with a maximum of speed, and which will be in no danger of destruction because of a dead engine or a sudden dive. Further objects are the effecting of improvements in materials and methods of manufacture which will reduce expense, enable materials to be employed which are immediately at hand and unlimited in quantity, which will simplify and lighten the machine, greatly decrease its liability to injury from fire, shrapnel, moisture and consequent weakening of glued joints and surfaces, will increase its strength, and vastly multiply its speed of production.

The first series of advantages are obtained by having the planes made rotatably adjustable on an axis transverse to the fuselage and parallel with the planes, so that the pilot can at will set the planes varying between a parallel with the fuselage, and thirty or more degrees therefrom.

The second series of advantages are obtained by omitting the linen ordinarily used, and the complex framing necessitated thereby, and inclosing the longitudinal frame timbers of the planes with molded wood fiber or the like.

Referring to the drawings forming part of this specification, Figure 1 is a perspective view of an aeroplane embodying my improvements. Fig. 2 is a side sectional view of the same. Fig. 3 is a transverse section of the upper plane of a biplane machine, to which my invention is illustrated as applied. Fig. 4 is a longitudinal section of one of the planes. Fig. 5 is a sectional view of certain parts of the rotary supporting means for the wings. Fig. 6 is a front elevation of the aeroplane. Fig. 7 a top view thereof. Fig. 8 is a sectional plan and Fig. 9 is a side view of a torpedo carried by the aeroplane.

In the drawings, the reference numeral 1 designates the upper plane of a biplane aeroplane, 2 the lower planes, and 3 the fuselage, here shown as of twin type. These planes are not fastened directly to the fuselage, but the two lower planes 2 are rigidly connected to the single upper plane 1, such connection including uprights 4. The latter are fastened to a circular metal frame or wheel 5 at each side of the fuselage, and said wheels are mounted rigidly upon the ends of a shaft 6 passing transversely through the fuselage parallel with the planes. To strengthen these circular frames or wheels 5 and shaft 6 against bending or breaking, a corresponding frame 7 is provided against which each wheel 5 rests, the frames 7 being fastened rigidly to the fuselage 3.

As shown in Fig. 5, raceways may be provided for ball bearings 8 to diminish friction between the frames 5 and 7. These are not, however, at all necessary for lighter aeroplanes, nor even the frames 7; and the frames 5 can be cut down in form and dimensions, but for the heavier machines the structure illustrated is of additional value.

On the shaft 6 is mounted a toothed wheel 9 with which meshes a worm 10 operated by a suitable hand wheel 11 convenient of access for the pilot.

The operation of the aeroplane is as follows: The same being on the ground, with the wings turned to present a comparatively steep angle of incidence, the engines are set in motion in the usual manner. After a short race over the ground, the machine quickly takes flight into the air, rising with a bound to the desired height. If a less rapid ascent is preferred, the hand wheel 11 is revolved to reduce the angle of the planes; or if a straightaway run is desired, the planes are adjusted to still more reduce the angle of the planes with respect to the fuselage.

Should, now, the engines give out, or for some other reason should the aeroplane dive toward the earth, the pilot quickly revolves the hand wheel 11 until the planes are adjusted to a maximum angle so as to present their under surfaces nearly broadside to the air. This will, in connection with a suitable manipulation of altitude rudders, soon bring the aeroplane to an even keel and enable it to volplane safely to the ground.

In the construction of the planes, I provide a suitable number of ribs 12 extended longitudinally of the same, and fasten upon the under and upper surfaces of these ribs sheets of compressed fiber 13, 14. As shown in Fig. 3, these fiber sheets are molded to be thicker in the vicinity of the ribs, but to thin gradually out toward both the front edges 15 and the rear edges 16. These edges are fastened tightly together either by riveting, or by bending sharply over an edge a sheet of thin metal 17, as illustrated at the front edge 15 in Fig. 3.

The sheet fiber is similarly thinned toward the ends of the wings, as shown in Fig. 4, the ribs 12 being similarly thinned out or tapered where less strength is needed.

Among other advantages possessed by this material over the fabric ordinarily employed, are these: It will not rip or tear, and a bullet will merely make a smooth hole through it without materially affecting either its strength or its resistance to the air; no expensive and fragile framing is needed for its support, merely the ribs; it is practically incombustible; no glue is needed for attaching it to the ribs, simply tacks or nails, and any moisture condensing within the interior of the planes due to the cold of higher altitudes, cannot affect the attaching means.

As the aeroplane herein set forth is primarily designed for war purposes, both fighting and bombing, and particularly for bombing, the fuselage is illustrated as of twin type, the two bodies 3 being separated for three or four feet, and joined by a light platform 20 supported preferably below the level of the bodies. Near the center of the platform is an opening 21 within which are two gimbal rings 22, 23 carrying within the inner ring 23 a torpedo or bomb 24 held therein by any easily detachable locking means, as the latches 25. Thus supported by gimbal rings, and the center of gravity of the bomb 24 being below the rings, the bomb is always in a vertical position no matter what the angle of the flying machine,—within certain limits. Figs. 8 and 9.

Behind the bomb and in front of the seat 26 provided for the bomber, is a smaller opening 27 designed to receive the telescope through which the bomber is scanning the earth below. When he sees that he is suitably positioned above the object to be bombed, the latches 25 are disengaged from the bomb and the latter permitted to drop to its destination.

In case the pilot occupying the seat 30 near the hand wheel 11 is killed or otherwise disabled, it is necessary for the occupant of the seat 31 to control the feathering of the planes. To permit this, a second hand wheel 32 is provided joined by a sprocket chain 33 and sprocket wheels 34 to the hand wheel 11, as shown in Figs. 6 and 7.

What I claim is:

An aeroplane comprising a fuselage, a shaft supported transversely of the same with its ends extending beyond the outer sides of the fuselage, means for rotatively adjusting said shaft, a frame fastened upon each extended shaft-end, two uprights fastened to each frame and rising above the fuselage, a plane attached to the upper ends of said uprights and centrally disposed relative to the fuselage, and two short planes connected with the lower ends of said uprights parallel with the first-recited plane.

In testimony that I claim the foregoing invention I have hereunto set my hand this 10th day of April, 1918.

LEONARD ATWOOD.